United States Patent
Hong et al.

(10) Patent No.: US 8,228,419 B2
(45) Date of Patent: Jul. 24, 2012

(54) METHOD OF CONTROLLING DIGITAL PHOTOGRAPHING APPARATUS FOR OUT-FOCUSING OPERATION AND DIGITAL PHOTOGRAPHING APPARATUS ADOPTING THE METHOD

(75) Inventors: Soon-hac Hong, Seongnam-si (KR); Kun-sop Kim, Yongin-si (KR); Jun-il Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 865 days.

(21) Appl. No.: 11/064,245

(22) Filed: Feb. 22, 2005

(65) Prior Publication Data

US 2006/0087578 A1  Apr. 27, 2006

(30) Foreign Application Priority Data

Oct. 27, 2004  (KR) .................. 10-2004-0086128

(51) Int. Cl.
*H04N 5/232* (2006.01)
*H04N 5/262* (2006.01)

(52) U.S. Cl. .................... 348/346; 348/240.3

(58) Field of Classification Search .......... 348/333.01, 348/345, 333.11, 354, 350, 243, 231.99, 348/33.01, 348, 349, 355, 207.99, 346, 333.08, 348/124.3, 340, 240.3; 369/44, 44.29
See application file for complete search history.

(56) References Cited

U.S. PATENT DOCUMENTS

| | | | | |
|---|---|---|---|---|
| 5,555,068 | A  * | 9/1996 | Utagawa | 396/121 |
| 5,920,349 | A  * | 7/1999 | Okino et al. | 348/354 |
| 6,801,642 | B2 * | 10/2004 | Gorday et al. | 382/118 |
| 6,900,841 | B1 * | 5/2005 | Mihara | 348/345 |
| 7,053,953 | B2 * | 5/2006 | Belz et al. | 348/346 |
| 7,227,576 | B2 * | 6/2007 | Umeyama | 348/333.11 |
| 2002/0191100 | A1 | 12/2002 | Matsunaga et al. | |
| 2003/0071908 | A1 * | 4/2003 | Sannoh et al. | 348/345 |
| 2003/0117511 | A1 * | 6/2003 | Belz et al. | 348/333.11 |
| 2003/0174230 | A1 * | 9/2003 | Ide et al. | 348/345 |
| 2004/0001220 | A1 * | 1/2004 | Gorday et al. | 358/1.15 |
| 2004/0119876 | A1 | 6/2004 | Ohmori et al. | |
| 2004/0201770 | A1 * | 10/2004 | Sawachi | 348/350 |

FOREIGN PATENT DOCUMENTS

KR  1020020096958 A  12/2002

OTHER PUBLICATIONS

Notice of Allowability issued for KR 10-2004-0086128 (Sep. 27, 2011).

* cited by examiner

*Primary Examiner* — David Ometz
*Assistant Examiner* — Ahmed A Berhan
(74) *Attorney, Agent, or Firm* — Drinker Biddle & Reath LLP

(57) ABSTRACT

Provided is a method of controlling a digital photographing apparatus that displays an image of a photograph region on a display panel, generates an image signal of the photograph region in response to signals generated by a shutter release button, and stores image data of the image signal in a storage medium. In an out-focusing mode, the method includes amplifying the blurriness of an out-focusing region by low-pass-filtering image data of regions excluding a setting region within the photograph region.

20 Claims, 12 Drawing Sheets

METHOD OF CONTROLLING DIGITAL PHOTOGRAPHING APPARATUS FOR OUT-FOCUSING OPERATION AND DIGITAL PHOTOGRAPHING APPARATUS ADOPTING THE METHOD

BACKGROUND OF THE INVENTION

This application claims the priority of Korean Patent Application No. 10-2004-0086128, filed on Oct. 27, 2004, in the Korean Intellectual Property Office, the disclosure of which is incorporated herein in its entirety by reference.

1. Field of the Invention

The present invention relates to a method of controlling a digital photographing apparatus and a digital photographing apparatus adopting the method. More particularly, the present invention relates to a method of controlling a digital photographing apparatus that displays an image in a photograph region on a display panel, generates an image signal of the photograph region in response to signals generated by a shutter release button, and stores image data of the image signal in a storage medium, and a digital photographing apparatus adopting the method.

2. Description of the Related Art

A conventional digital photographing apparatus is disclosed in U.S. Patent Publication No. 119,876 entitled "Method of Notification of Inadequate Picture Quality", filed in 2004. In the disclosed conventional photographing apparatus, an image of a photograph region is displayed on a display panel, an image signal of the photograph region is generated in response to signals generated by a shutter release button, and image data of the image signal is stored in a storage medium.

Out-focusing is a photographing technique of making clear only a region desired by a user in a photograph region and making the remaining out-focusing regions blurred. However, out-focusing requires knowledge about camera lenses. Thus, ordinary users without such knowledge cannot easily perform out-focusing.

SUMMARY OF THE INVENTION

Various embodiments of the present invention provide a digital photographing apparatus and a method of controlling the same which enable general users, i.e. those without knowledge about camera lenses, to easily perform out-focusing.

According to an embodiment of the present invention, there is provided a method of controlling a digital photographing apparatus that displays an image of a photograph region on a display panel, generates an image signal of the photograph region in response to signals generated by the manipulation of a shutter release button, and stores image data of the image signal in a storage medium. When the digital photographing apparatus is operating in an out-focusing mode, the method includes low-pass filtering image data of regions excluding a setting region in the photograph region.

In the method, when a user sets an out-focusing mode, a setting region becomes clear while the remaining out-focusing region becomes blurred. Accordingly, general users without knowledge about camera lenses can easily perform out-focusing.

According to another embodiment of the present invention, there is provided a digital photographing apparatus using the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
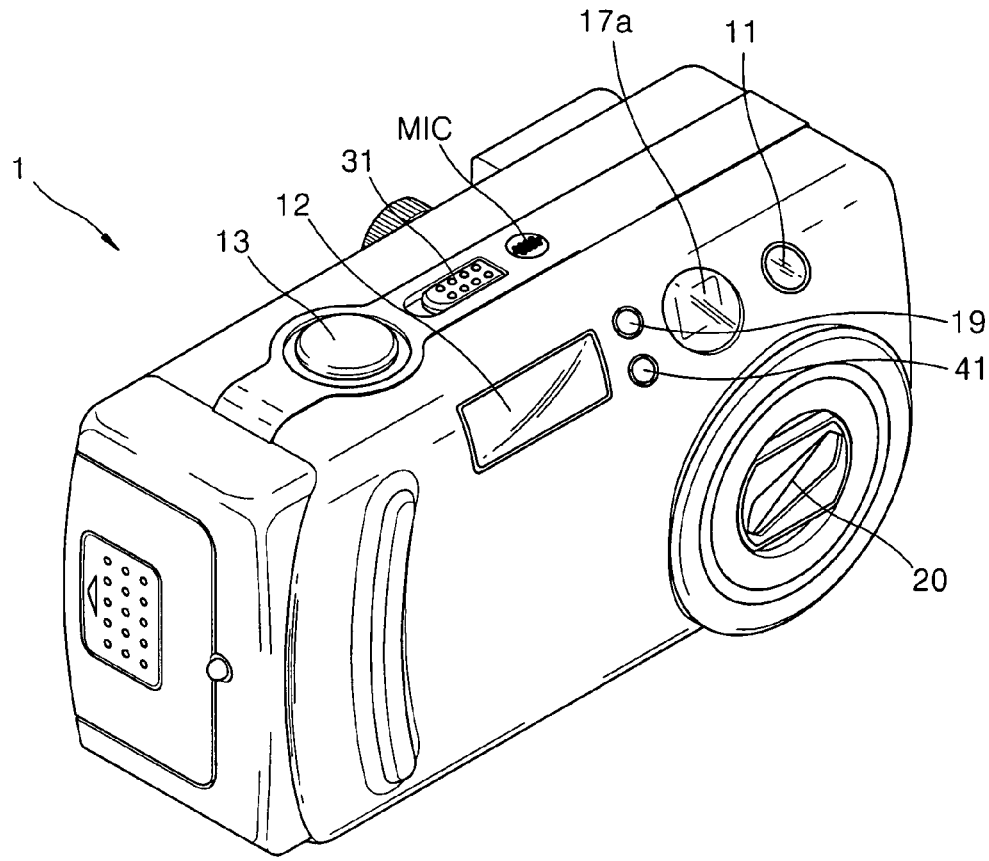
FIG. 1 is a perspective view illustrating the front and the top of a digital camera according to an embodiment of the present invention.

Referring to FIG. 1, the front part of an embodiment of a digital camera 1 according to the present invention includes a microphone MIC, a self-timer lamp 11, a flash 12, a shutter release button 13, a viewfinder 17a, a flash light intensity sensor 19, a power switch 31, a lens unit 20, and a remote receiver 41.

In a self-timer mode, the self-timer lamp 11 operates for a set period of time from the time when the shutter release button 13 is pressed to the time when an image starts to be captured. When the flash 12 operates, the flash light intensity sensor 19 senses the intensity of the light generated by the flash 12 and relays the sensed intensity of the light to a digital camera processor (DCP) 507 of FIG. 3 via a micro-controller 512 of FIG. 3. The remote receiver 41 receives command signals, for example, a photographing command signal, from a remote controller (not shown) and relays the photographing command signal to the DCP 507 via the micro-controller 512.

The shutter release button 13 has two levels. In other words, referring to FIGS. 4 and 6, when a user lightly depresses the shutter release button 13 (see FIG. 1) to a first level, a first level signal S1 from the shutter release button 13 is turned on. When the user fully depresses the shutter release button 13 to a second level, a second level signal S2 from the shutter release button 13 is turned on.

Figure 2:
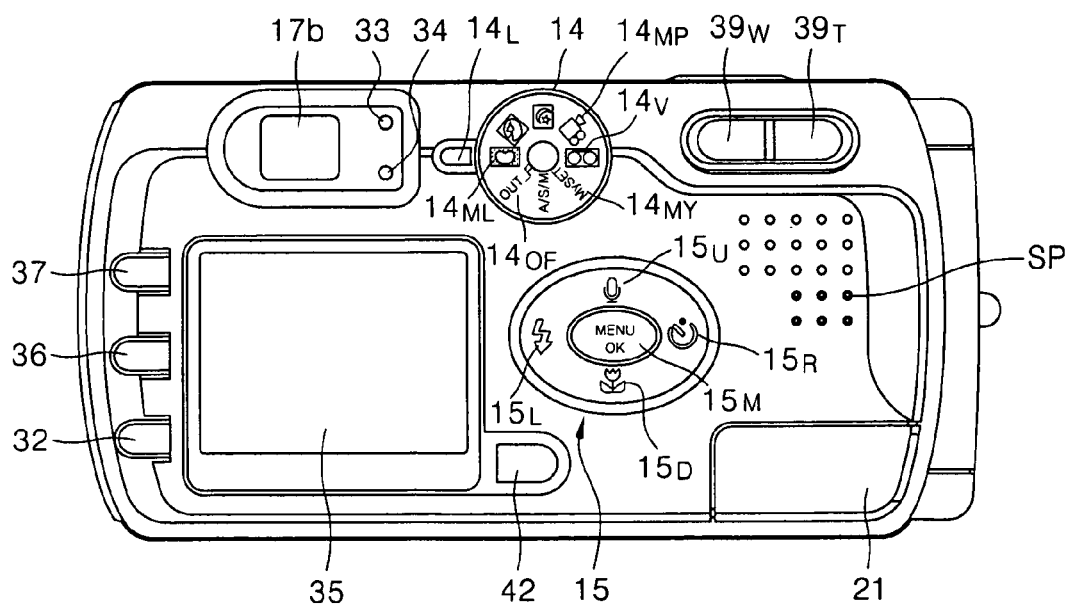
FIG. 2 is a perspective view illustrating the back of the digital camera of FIG. 1.

Referring to FIG. 2, the back of the digital camera 1 according to an embodiment of the present invention includes a mode dial 14, functional buttons 15, a manual focus/delete button 36, a manual adjust/reproduce/terminate button 37, a reproduction mode button 42, a speaker SP, a monitor button 32, an automatic focusing lamp 33, a viewfinder 17b, a flash standby lamp 34, a color LCD panel 35, a wide-angle zoom button $39_W$, a telephoto zoom button $39_T$, and an external interface unit 21.

The mode dial 14 is used for selecting the operating modes of the digital camera 1, such as an out-focusing mode $14_{OF}$, a simple photographing mode, a character photographing mode $14_{ML}$, a night view photographing mode, a manual photographing mode, a moving-image photographing mode $14_{MP}$, a user-setting mode $14_{MY}$, and an audio recording mode $14_V$.

When a photograph is taken in the out-focusing mode $14_{OF}$, image data of regions except for a setting region in the photograph region is low-pass filtered. When the user sets the out-focusing mode $14_{OF}$, the setting region becomes clear and the regions except for the setting region become blurred. Therefore, even ordinary users without knowledge about camera lenses can easily perform the out-focusing mode $14_{OF}$. The out-focusing mode $14_{OF}$ will be described in detail later with reference to FIGS. 6 through 13.

In the moving-image photographing mode $14_{MP}$, a moving image is photographed. In the character photographing mode $14_{ML}$, photographing conditions set for photographing characters are applied. The user setting mode $14_{MY}$ is an operating mode in which a user selects photograph-taking settings for each photographing mode. The audio recording mode $14_V$ is for recording only sounds, for example, a user's voice. After selecting the audio recording mode $14_V$, when a user presses the shutter release button 13, an audio file is created in the memory card and audio data is stored in the audio file. When the user presses the shutter release button 13 again, the audio data stops being stored and the audio file is set.

The functional buttons 15 are used for operating specific functions of the digital camera 1. The functional buttons 15 are also used as control buttons to manage the movement of an active cursor on the menu screen of the color LCD panel 35. For example, in a reproduction mode, if an image currently displayed is not enlarged, when a user presses a self-timer/right button $15_R$, a next file in a forward direction is displayed. If an image currently displayed is enlarged, when the user presses the self-timer/right button $15_R$, a display region of the enlarged image is moved to the right. In a preview mode, if the user presses the self-timer/right button $15_R$, a self-timer operation, e.g., automatic photographing after 10 seconds, is performed.

In the reproduction mode, if the image currently displayed is not enlarged, when the user presses a flash/left button $15_L$, a next file in a reverse direction is displayed. If the image currently displayed is enlarged, when the user presses the flash/left button $15_L$, the display region of the enlarged image is moved to the left. In the preview mode, if the user presses the flash/left button $15_L$, any one of the flash modes for a photographing mode is set.

In the reproduction mode, if the image currently displayed is enlarged, when the user presses a macro/down button $15_D$, the display region of the enlarged image is moved down. In the preview mode, the user may set automatic proximity focusing by pressing the macro/down button $15_D$.

In the reproduction mode, when the image currently displayed is enlarged, if the user presses a voice-memo/up button $15_U$, the display region of the enlarged image is moved up. In the preview mode, if the user presses the voice-memo/up button $15_U$, a 10 second recording is possible upon consecutive photographing.

In a setting mode from the preview mode, if the user presses a menu/select-confirm button $15_M$ when the active cursor is on a selection menu, the operation corresponding to the selection menu is performed.

The manual adjust/reproduce/terminate button 37 is used for manual adjustment of specific conditions. In addition, in the reproduction mode, when the user presses the manual adjust/reproduce/terminate button 37, a selected moving-image file may be reproduced or its reproduction may be terminated.

The manual focus/delete button 36 is used for manual focusing or deleting in the photographing mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the reproduction mode, when the user presses the monitor button 32 while an image file is being reproduced, photographing information about the image file is displayed on the color LCD panel 35. When the user presses the monitor button 32 again, only images are displayed.

The reproduction mode button 42 is used for switching between the reproduction mode and the preview mode.

The automatic focusing lamp 33 operates when a focus is well adjusted. The flash standby lamp 34 operates when the flash 12 of FIG. 1 is in a standby mode. A mode-indicating lamp $14_L$ indicates a selection mode of the mode dial 14.

Figure 3:
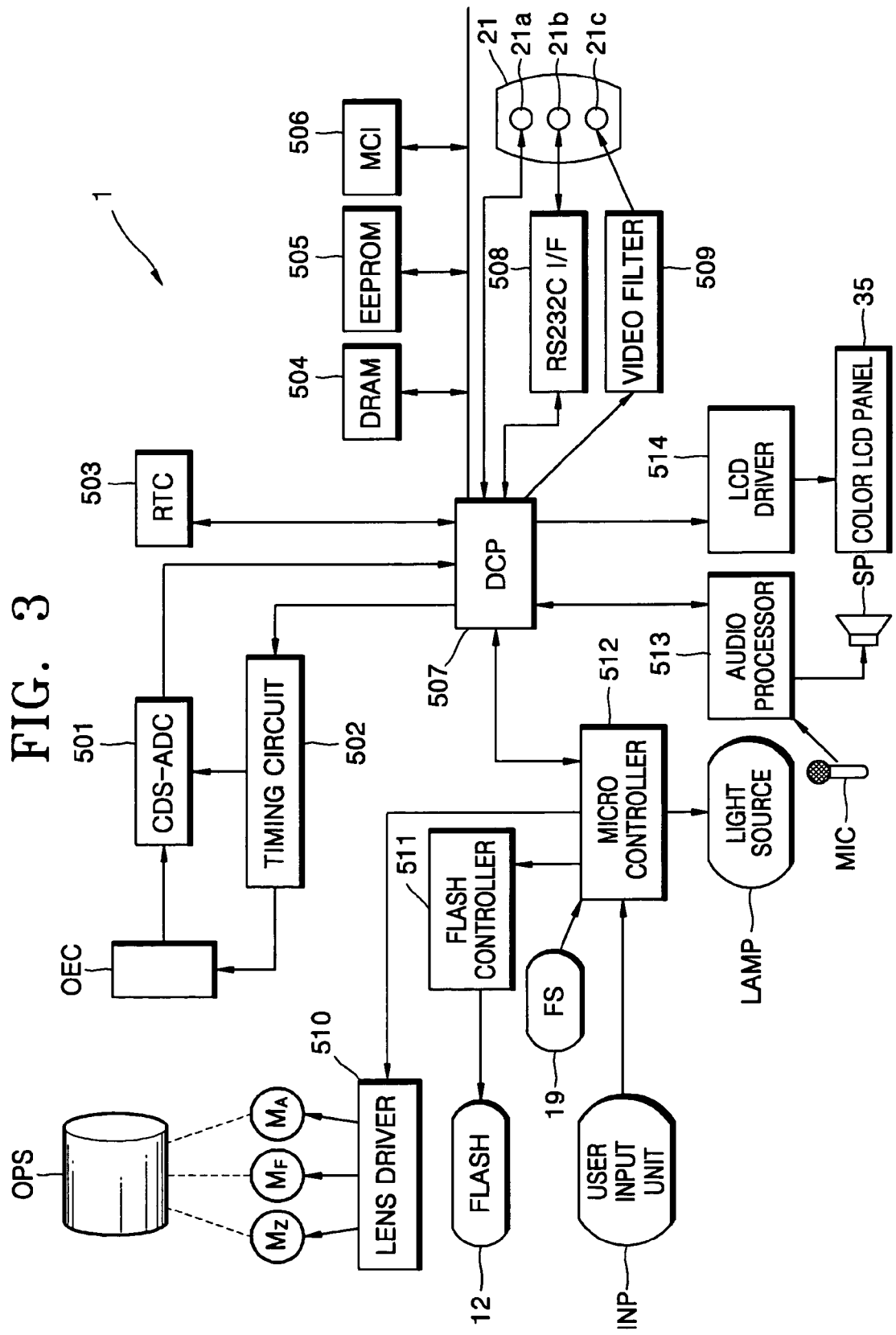
FIG. 3 is a schematic diagram of the configuration of the digital camera of FIG. 1.

FIG. 3 is a schematic diagram of the configuration of the digital camera 1 of FIG. 1. The configuration and operation of the digital camera 1 of FIG. 1 will now be described with reference to FIGS. 1 through 3.

An optical system (OPS) including the lens unit 20 and a filter unit optically processes light. The lens unit 20 of the OPS includes a zoom lens, a focal lens, and a compensation lens.

When the user presses the wide angle-zoom button $39_W$ or the telephoto-zoom button $39_T$ included in a user input unit (INP), a signal corresponding to the wide angle-zoom button $39_W$ or the telephoto-zoom button $39_T$ is relayed to the micro-controller 512. The micro-controller 512 controls a lens driver 510, thereby running a zoom motor $M_Z$, which in turn, moves the zoom lens. In other words, when the user presses the wide angle-zoom button $39_W$, the focus length of the zoom lens becomes short, thereby widening the angle of view. When the user presses the telephoto-zoom button $39_T$, the focus length of the zoom lens becomes long, thereby narrowing the angle of view. Since the position of the focus lens is adjusted in a state where the position of the zoom lens is set, the angle of view is hardly affected by the position of the focus lens.

In the automatic focusing mode, a main controller built into the DCP 507 controls the lens driver 510 through the micro-controller 512, thereby driving a focus motor $M_F$. Accordingly, when the focus lens is moved, the position of the focus lens, for example, a number of driving steps of the focus motor $M_F$, having a largest high frequency component of an image signal is set.

The compensation lens in the lens unit 20 of the OPS is not separately operated because the compensation lens compensates for the entire refractive index. Reference numeral $M_A$ indicates a motor for driving an aperture (not shown).

An optical low pass filter included in the filter unit of the OPS eliminates high frequency optical noise. An infrared cut filter included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DCP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise, adjusts amplitude, and then converts the analog signal into a digital signal.

A real time clock (RTC) 503 provides time information to the DCP 507. The DCP 507 processes the digital signal from the CDS-ADC 501 and generates a digital image composed of luminance and chromaticity values.

A light source (LAMP) is operated by the micro-controller 512 in response to a control signal generated by the DCP 507 including the main controller. The light source (LAMP) includes the self-timer lamp 11, the automatic focusing lamp 33, the mode indicating lamp $14_L$, and the flash standby lamp 34. The INP includes the shutter release button 13, the mode dial 14, the functional buttons 15, the monitor button 32, the manual focus/delete button 36, the manual adjust/reproduce/terminate button 37, the wide angle-zoom button $39_W$, the telephoto-zoom button $39_T$, and the reproduction mode button 42.

A dynamic random access memory (DRAM) 504 temporarily stores a digital image signal from the DCP 507. An electrically erasable and programmable read only memory (EEPROM) 505 stores programs and setting data. A user's memory card is inserted or removed in a memory card interface 506. The digital image signal from the DCP 507 is input to an LCD driver 514, thereby displaying an image on the color LCD panel 35.

The digital image signal from the DCP 507 can be transmitted via a universal serial bus (USB) connector 21a or via an RS232C interface 508 and an RS232C connector 21b for serial communications. The digital image signal from the DCP 507 can also be transmitted as a video signal via a video filter 509 and a video output unit 21c. Here, the DCP 507 includes the main controller.

An audio processor 513 can relay sound from the microphone MIC to the DCP 507 or to speaker SP. In addition, the audio processor 513 can output an audio signal from the DCP 507 to the speaker SP. The micro-controller 512 controls the operation of a flash controller 511 in response to a signal from the flash light intensity sensor 19, thereby driving the flash 12.

A main program of the DCP 507 of FIG. 3 will be now described with reference to FIGS. 1 through 4.

Figure 5:
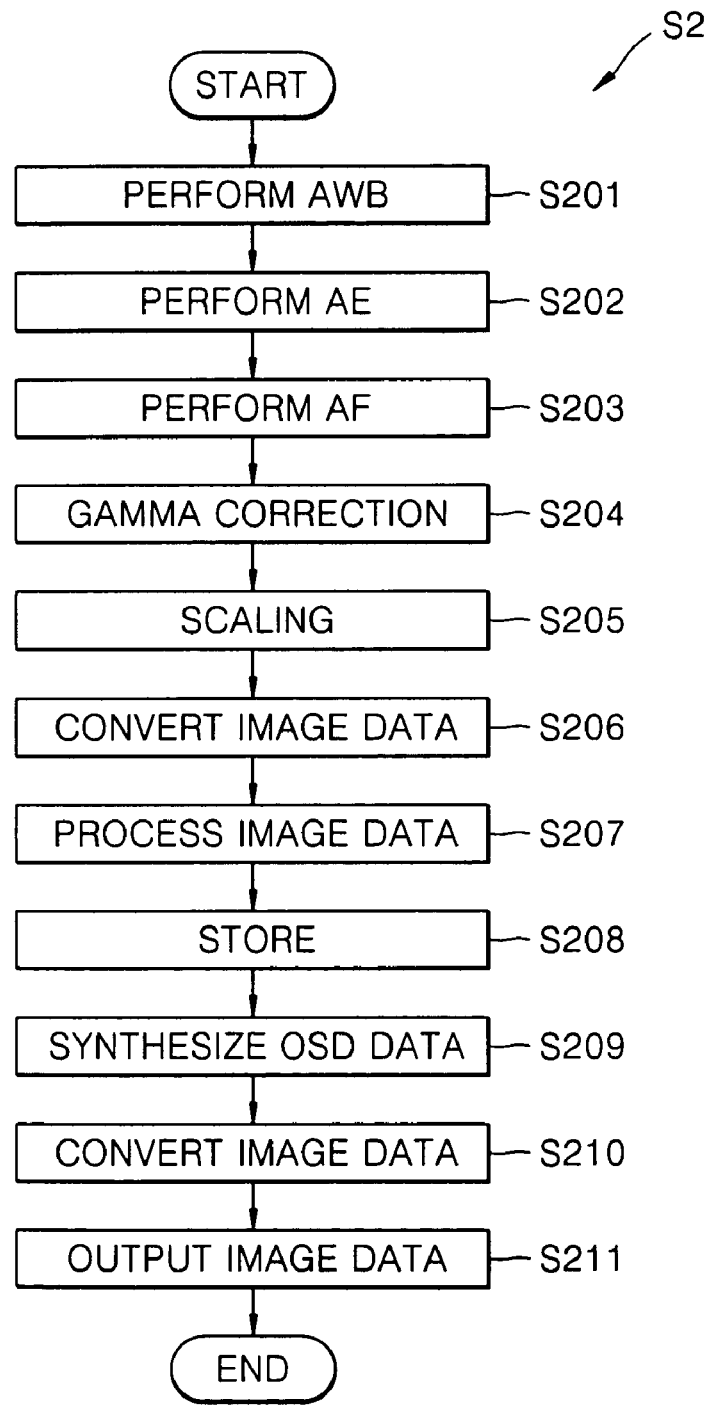
FIG. 5 illustrates the steps for performing am embodiment of the preview mode of FIG. 4.

When power is applied to the digital camera 1, the DCP 507 is initialized (S1). After the initialization (S1), the DCP 507 performs a preview mode (S2). In the preview mode, an image input is displayed on the color LCD panel 35. An operation related to the preview mode will be described in detail later with reference to FIG. 5.

When the first level signal S1 from the shutter release button 13 is on after a user presses the shutter release button 13 to the first level (S3), the DCP 507 performs a current photographing mode (S4). The photographing mode (S4) algorithm will be described later with reference to FIGS. 6 through 13.

When INP generated signals corresponding to a setting mode are input (S5), the setting mode for setting an operating condition in response to the input signals from the INP is performed (S6). For example, in the preview mode (S2), if a flash button signal is input after the user presses the flash/left button $15_L$ (S5), the setting mode for setting one of the flash modes is performed (S6).

When a termination signal is not generated, the DCP 507 continues to perform the following operations (S7).

Figure 14:
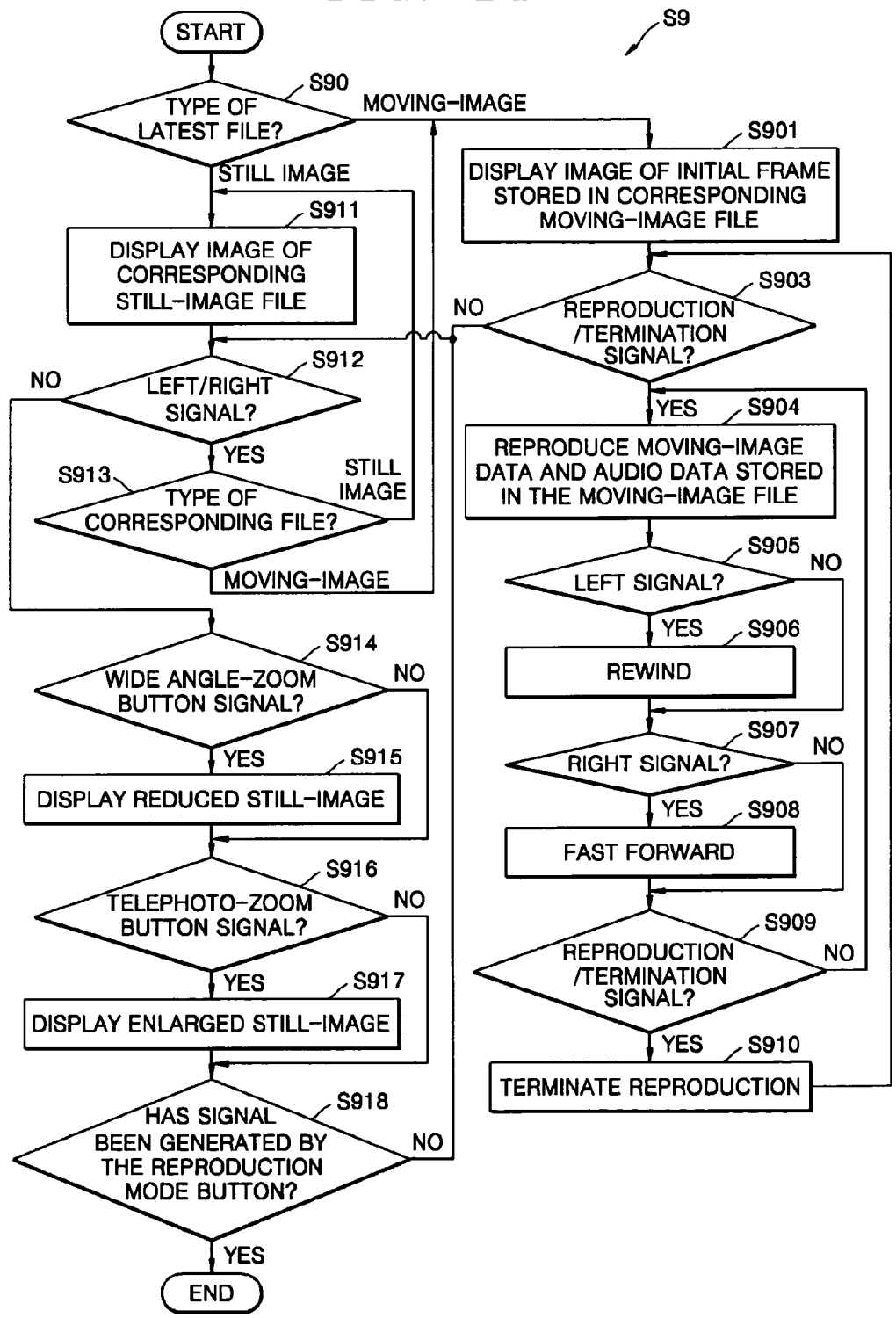
FIG. 14 is a flowchart of a reproduction mode program illustrated in FIG. 4.

When a signal is generated by the reproduction mode button 42 in the INP (S8), a reproduction mode is performed (S9). In the reproduction mode, reproduction is performed in response to input signals from the INP. The reproduction mode (S9) algorithm will be described later with reference to FIG. 14. When the reproduction mode is terminated, the above operations are repeated.

The preview mode (S2) algorithm of FIG. 4 will now be described with reference to FIGS. 1 through 3 and FIG. 5.

The DCP 507 performs automatic white balancing (AWB) and sets parameters related to the white balance (S201). The DCP 507 performs automatic exposure (AE) and automatic focusing (AF) (S202 and S203).

The DCP 507 performs gamma correction on input image data (S204) and scales the gamma corrected image data to meet display standards (S205). The DCP 507 converts the scaled input image data from an RGB (red, green, and blue) format into a luminance-chrominance format (S206). The DCP 507 processes the input image data depending on resolution and display location, and filters the input image data (S207).

The DCP 507 temporarily stores the input image data in the DRAM 504 of FIG. 3 (S208). The DCP 507 synthesizes the data temporarily stored in the DRAM 504 of FIG. 3 and on-screen display (OSD) data (S209). The DCP 507 converts the synthesized image data from the RGB format into the luminance-chromaticity format (S210) and outputs the image data in the converted format via the LCD driver 514 of FIG. 3 (S211).

Figure 4:
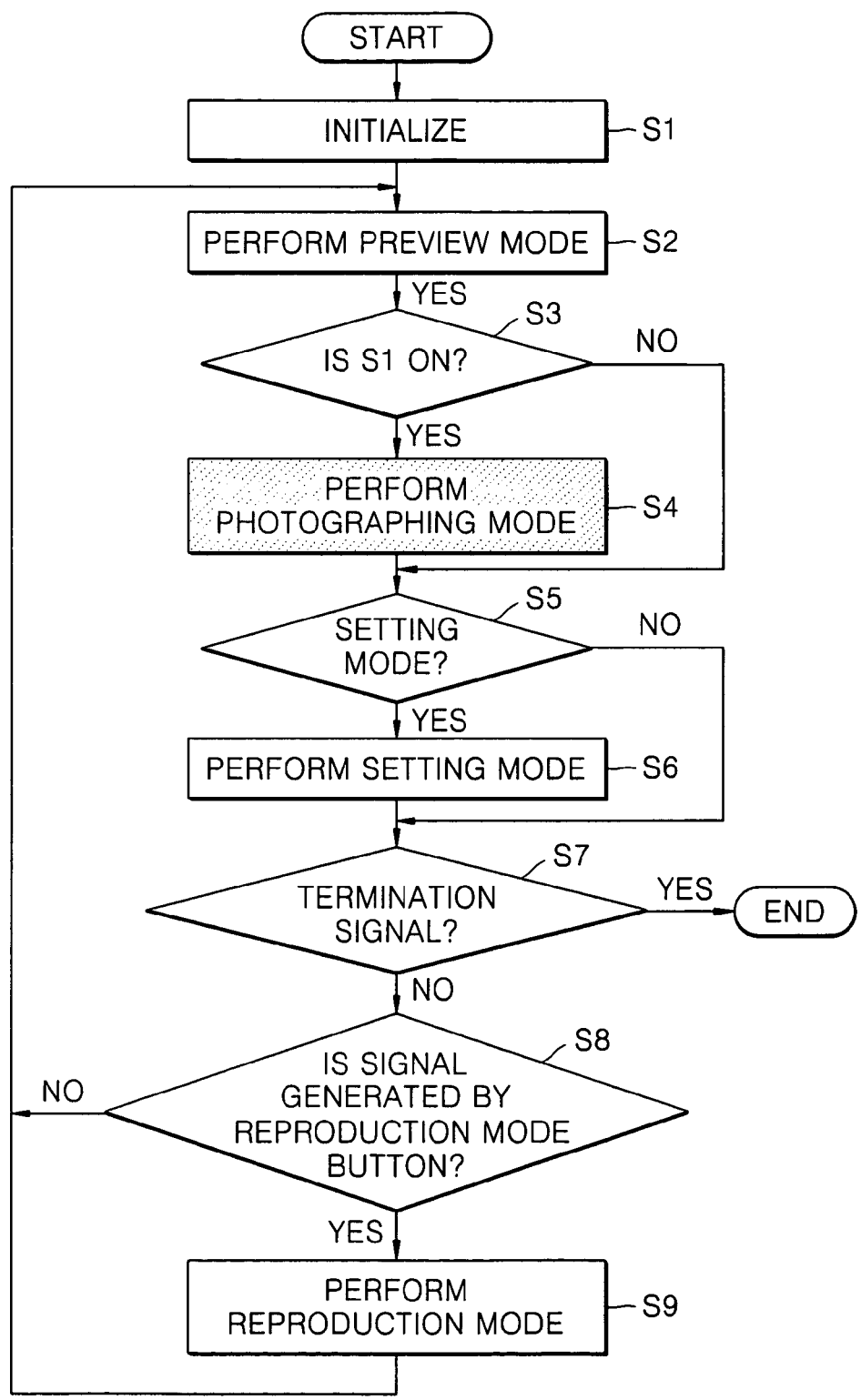
FIG. 4 is a flowchart illustrating a main program of a digital camera processor (DCP) illustrated in FIG. 3.
Figure 6:
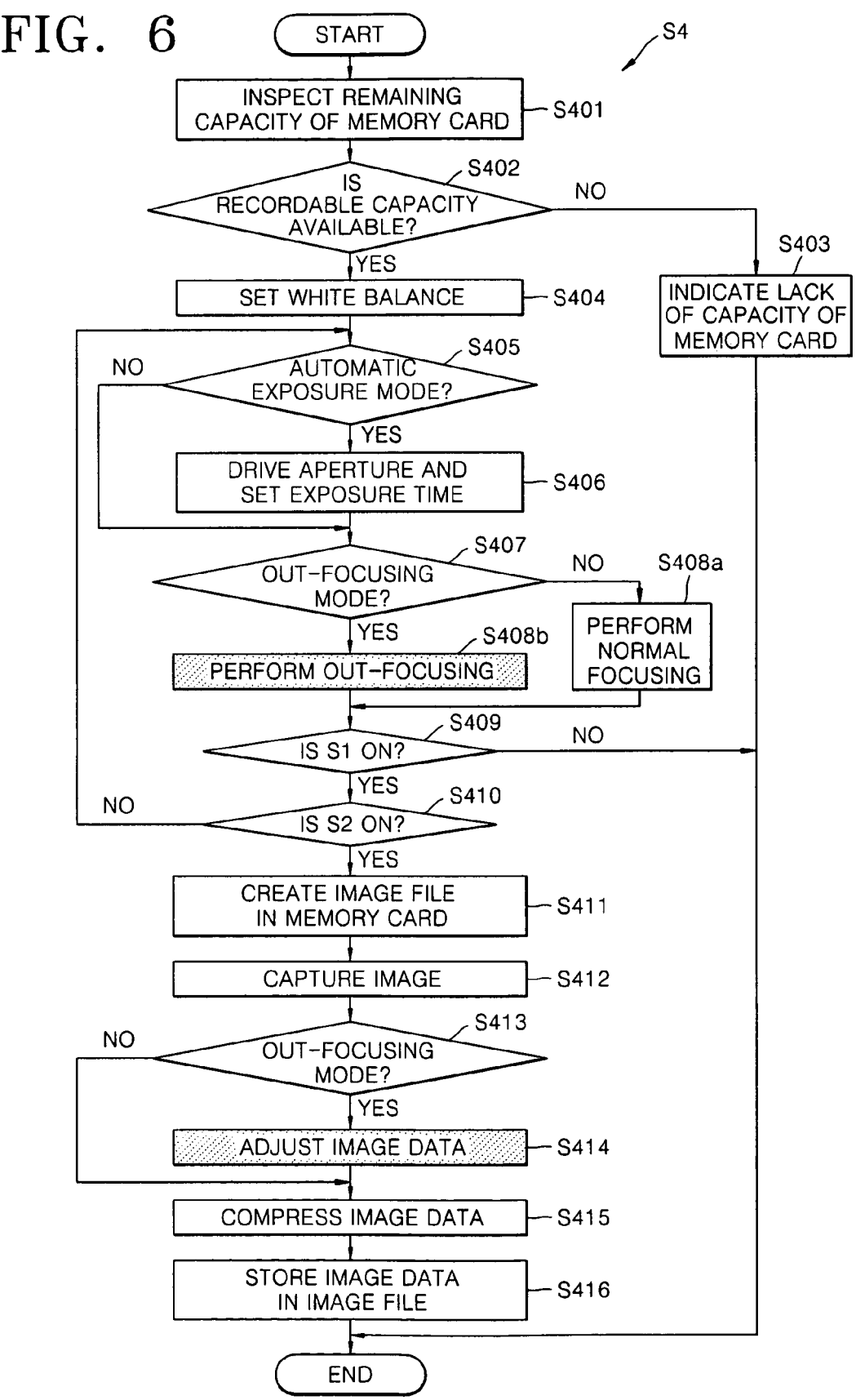
FIG. 6 illustrates steps for performing an embodiment of the photographing mode of FIG. 4.

FIG. 6 is a flowchart of the photographing mode (S4) program illustrated in FIG. 4. The photographing mode (S4) program will now be described with reference to FIGS. 1 through 3 and FIG. 6. Here, the present position of the zoom lens is already set.

The DCP 507 inspects the remaining capacity of the memory card (S401) and determines whether the memory card has enough capacity to store a digital image signal (S402). If the memory card does not have enough storage capacity, the DCP 507 indicates the lack of capacity of the memory card and ends the photographing mode (S403). If the memory card has enough storage capacity, the following operations are performed.

The DCP 507 sets white balance and parameters related to the white balance according to a present photographing condition (S404). In the automatic exposure mode (S405), the DCP 507 calculates the exposure by measuring incident luminance, drives the aperture driving motor $M_A$ according to the calculated exposure, and sets the exposure time (S406).

When in the out-focusing mode $14_{OF}$, the DCP 507 does out-focusing (S407 and S408b). When not in the out-focusing mode $14_{OF}$, the DCP 507 does normal focusing (S407 and S408a). The out-focusing mode $14_{OF}$ (S408b) algorithm will be described in detail later with reference to FIGS. 7 through 13.

When the first level signal S1 from the shutter release button 13 is on (S409), the DCP 507 continues to perform the following operations.

The DCP 507 identifies whether the second level signal S2 is on (S410). When the second level signal S2 is not on, it means that the user did not press the shutter release button 13 to the second level to take a photograph. Then, the DCP 507 repeats operations S405 through S410.

When the second level signal S2 is on, it means that the user pressed the shutter release button 13 to the second level and the DCP 507 creates an image file in the memory card (S411).

Next, the DCP 507 captures an image (S412). In other words, the DCP 507 receives still-image data from the CDS-ADC 501.

When in the out-focusing mode $14_{OF}$, the DCP 507 low-pass-filters image data in an out-focusing region, i.e., a region except for a setting region determined through out-focusing (S413 and S414). Accordingly, the setting region becomes clear whereas the remaining out-focusing region becomes blurred.

In operation S414, the out-focusing region is divided into a plurality of regions, and a focal distance of each of the regions, i.e., an estimated distance between the digital camera 1 and each of the regions, is used for the low-pass filtering. More particularly, as the difference between the focal distance of the setting region, i.e., a subject region, and the focal distance of each of the regions except for the setting region gets bigger, a cut-off frequency of each of the regions is set lower.

For example, if it is estimated that the focal distance of the subject region as the setting region is 5 m, the focal distance of a first region of the out-focusing region is 3 m, the focal distance of a second region of the out-focusing region is 7 m, the focal distance of a third region of the out-focusing region is 1 m, and the focal distance of a fourth region of the out-focusing region is 9 m, the cut-off frequencies of image data of the first and second regions are set to 10 KHz and the cut-off frequencies of image data of the third and fourth regions are set to 5 KHz. Thus, out-focusing effects can be enhanced further.

The DCP 507 compresses the received still-image data (S415). The DCP 507 stores the compressed still-image data in the image file (S416).

Figure 7:
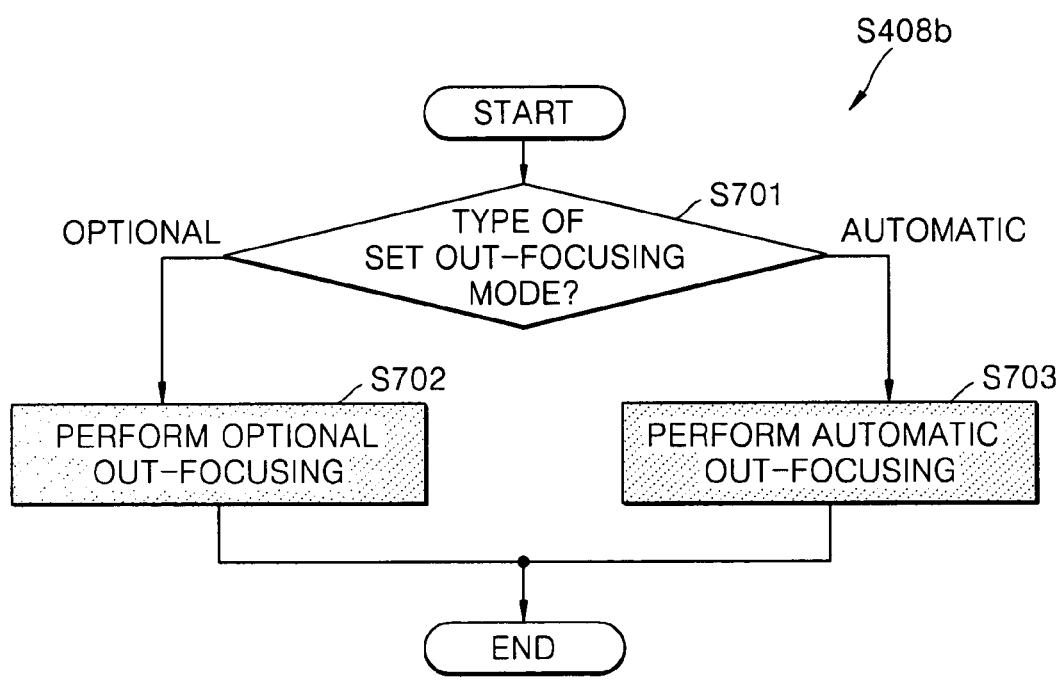
FIG. 7 is a flowchart of an embodiment of the out-focusing program illustrated in FIG. 6.

Referring to FIG. 7, in the out-focusing operation (S408b) illustrated in FIG. 6, if the type of the out-focusing mode $14_{OF}$ set by the user is optional, the DCP 507 performs optional out-focusing (S701 and S702). If the type of the out-focusing mode $14_{OF}$ set by the user is automatic, the DCP 507 performs automatic out-focusing (S701 and S703).

Figure 8:
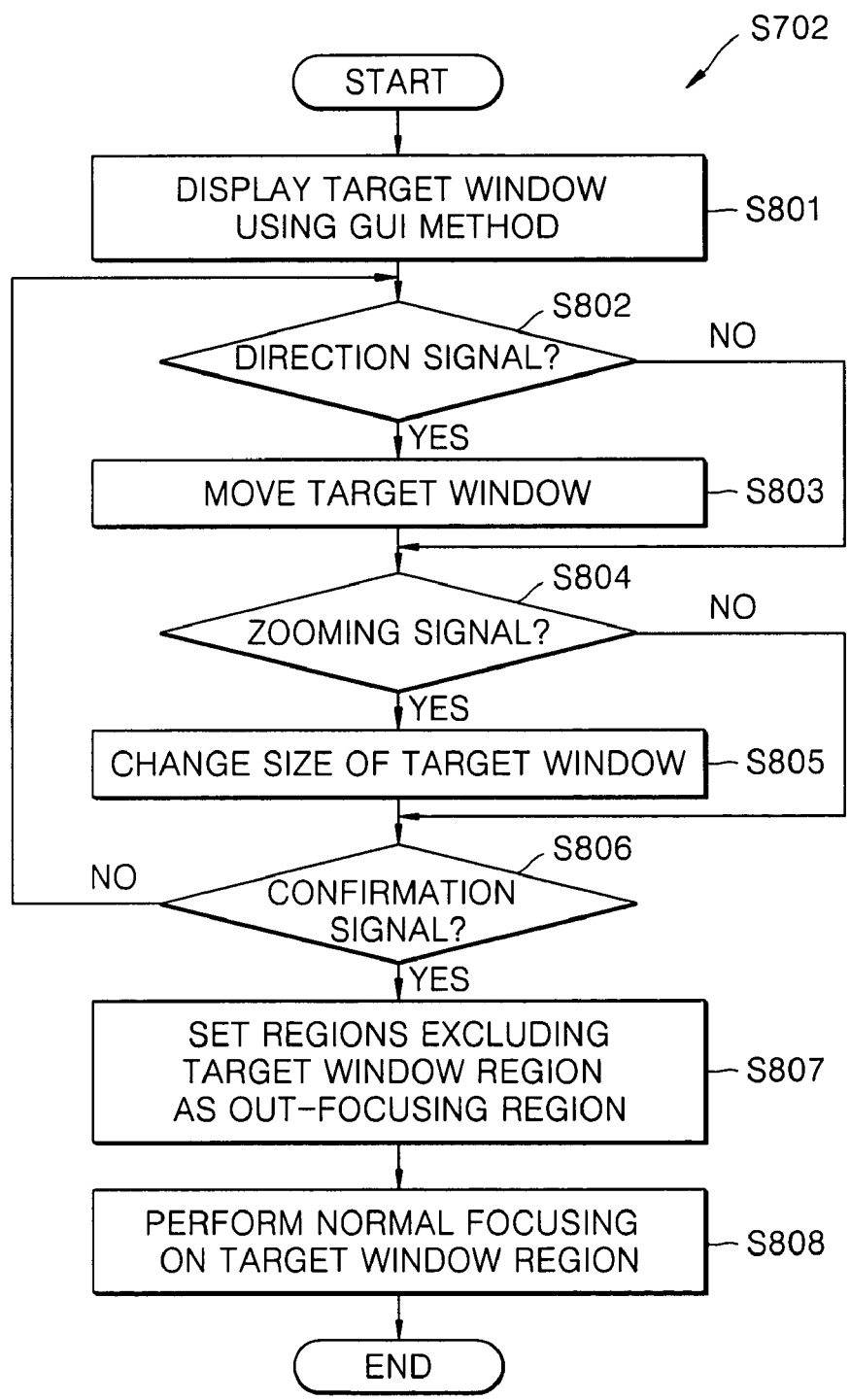
FIG. 8 is a flowchart of an embodiment of the optional out-focusing program illustrated in FIG. 7.
Figure 9:
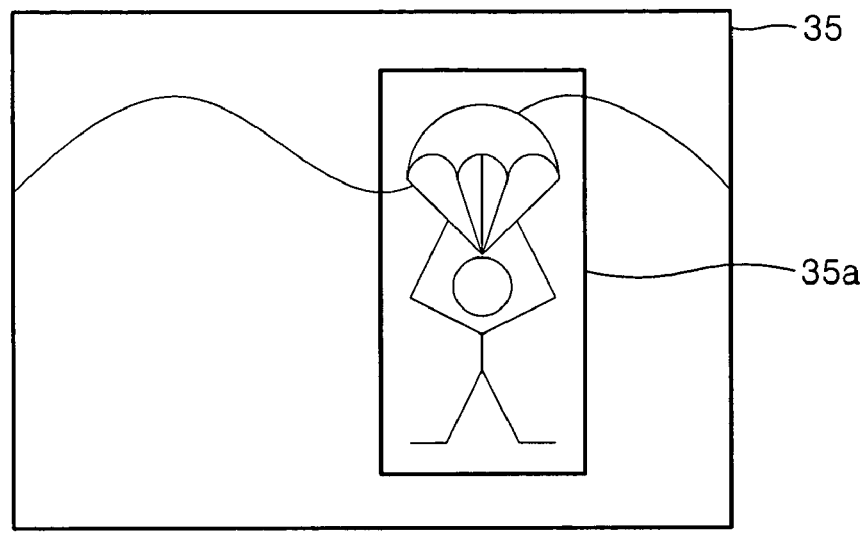
FIG. 9 depicts an image displayed on a color LCD panel as a result of performing operation S801 of FIG. 8 according to an embodiment of the present invention.

FIG. 8 is a flowchart of the optional out-focusing (S702) program of FIG. 7. FIG. 9 illustrates a screen displayed on the color LCD panel 35 of FIGS. 2 and 3 as a result of performing operation S801 of FIG. 8 according to an embodiment of the present invention. The optional out-focusing (S702) program will now be described with reference to FIGS. 1 through 3, 8, and 9.

The DCP 507 displays a target window on the color LCD panel 35 using the well-known graphic user interface (GUI) method (S801). Here, the target window 35a is smaller than the photograph region.

The DCP 507 changes the position and size of the target window 35a according to signals input by the user (S802 through S805). Specifically, if the user generates a direction signal by pressing the self-timer/right button $15_R$, the flash/left button $15_L$, the macro/down button $15_D$, or the voice-memo/up button $15_U$, the DCP 507 moves the target window 35a in response to the direction signal (S802 and S803). In addition, the DCP 507 reduces or enlarges the target window 35a in response to a zooming signal generated by the wide angle-zoom button $39_W$ or the telephoto-zoom button $39_T$ (S804 and S805). Operations S802 through S805 are repeated until a confirmation signal is generated by the menu/select-confirm button $15_M$.

When the confirmation signal is generated by the menu/select-confirm button $15_M$, the DCP 507 sets regions excluding a region of the target window 35a as the out-focusing region (S806 and S807). Last, the DCP 507 performs normal focusing on the region of the target window 35a (S808).

Figure 10:
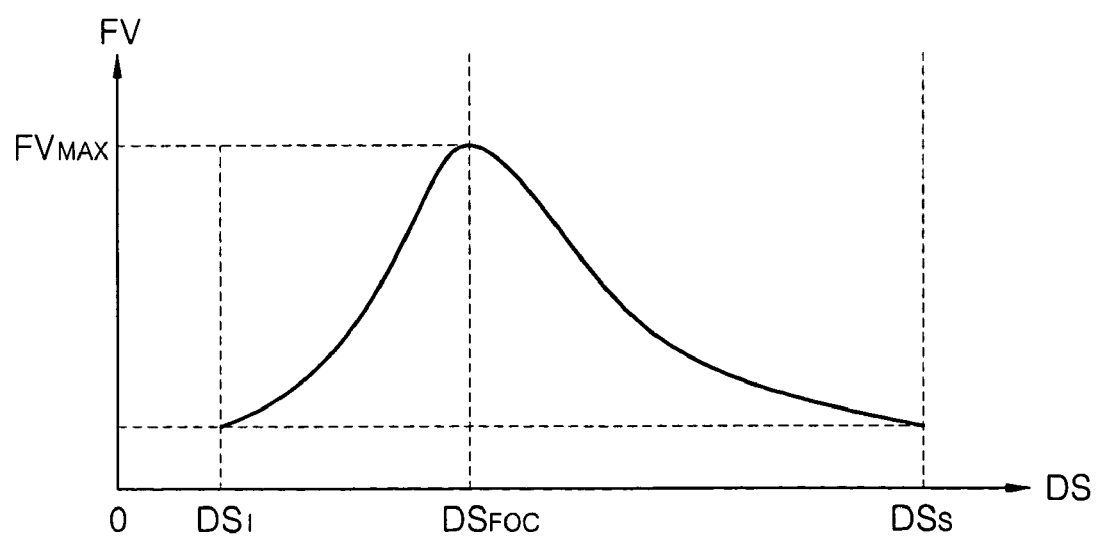
FIG. 10 is a graph illustrating a basic focusing program used in operation S808 of FIG. 8.

FIG. 10 is a graph of a basic focusing program applied to operation S808 of FIG. 8. Referring to FIG. 10, DS is the number of driving steps of the focal lens, and FV is a focus value that is proportional to the amount of high frequency contained in an image signal. $DS_I$ is the number of driving steps of the focal lens corresponding to a set maximum distance. $DS_{FOC}$ is the number of driving steps of the focal lens corresponding to the distance of a maximum focus value $FV_{MAX}$. $DS_S$ is the number of driving steps corresponding to a set minimum distance.

In the basic focusing program applied to operation S808 of FIG. 8, the DCP 507 scans a scanning region between $DS_I$ and $DS_S$, finds the maximum focus value $FV_{MAX}$, obtains focal position values $DS_{FOC}$ (i.e., the number of driving steps of the focal lens) corresponding to the maximum focus value $FV_{MAX}$, and moves the focal lens to a position corresponding to the obtained focal position value $DS_{FOC}$.

Figure 11:
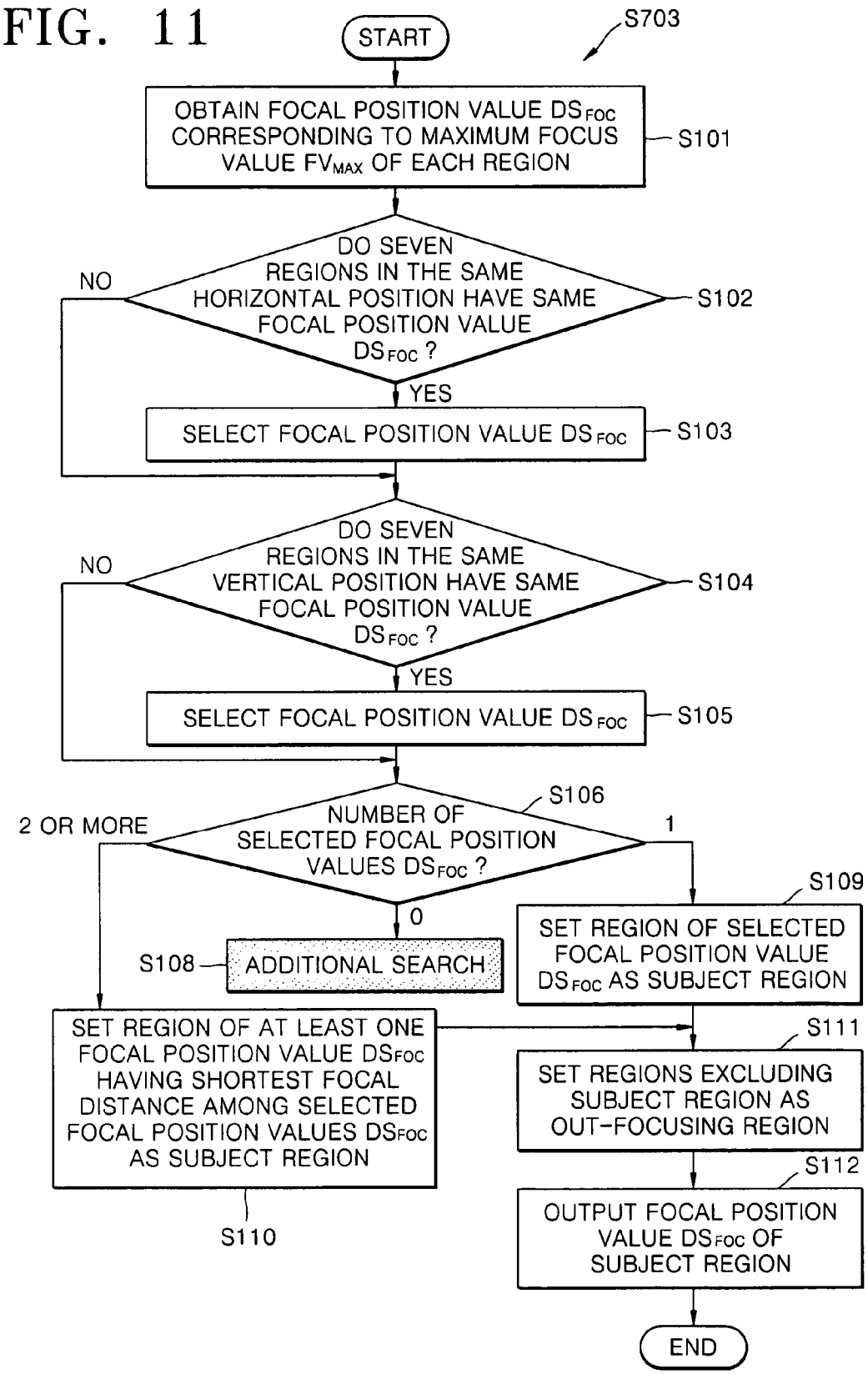
FIG. 11 is a flowchart of an embodiment of the automatic out-focusing program illustrated in FIG. 7.
Figure 12:
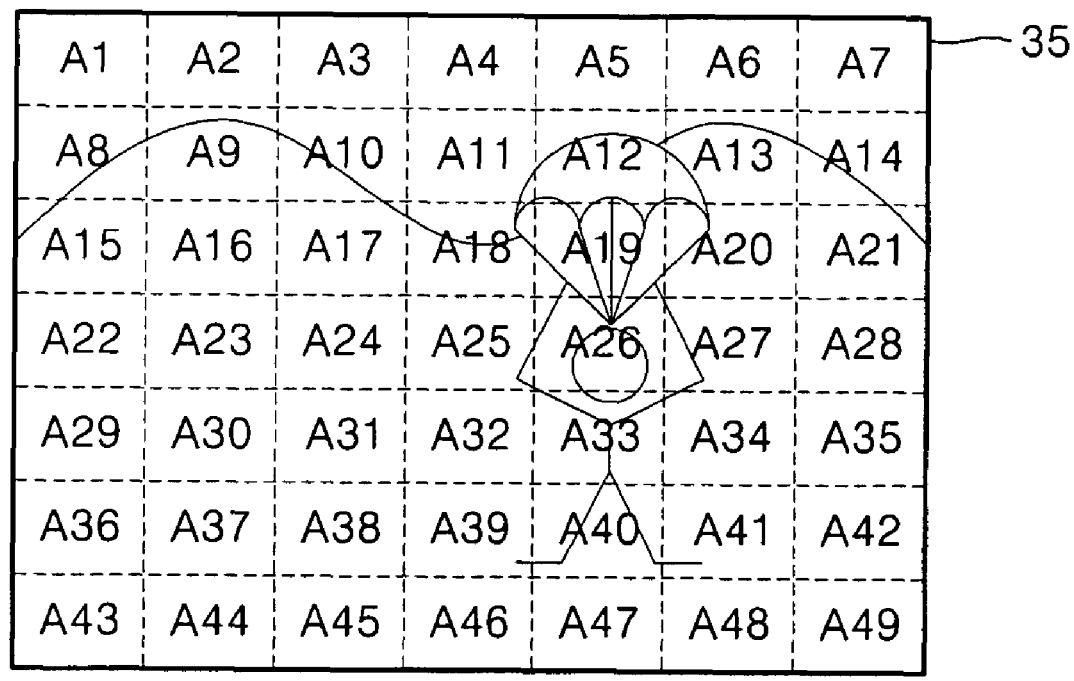
FIG. 12 illustrates a photograph region divided into a plurality of regions to perform the automatic out-focusing program of FIG. 11.

FIG. 11 is a flowchart illustrating the automatic out-focusing (S703) program of FIG. 7. FIG. 12 illustrates a photograph region of the color LCD panel 35 of FIGS. 2 and 3, which is divided into a plurality of regions A1 through A49 to perform the automatic out-focusing (S703) program. The automatic out-focusing (S703) program will be sequentially described with reference to FIGS. 10 through 12.

The DCP 507 scans the regions A1 through A49 within the scanning region between $DS_I$ and $DS_S$ and obtains the maximum focus value $FV_{MAX}$ and the focal position value $DS_{FOC}$ of the regions A1 through A49 (i.e., the number of driving steps of the focal lens) corresponding to the maximum focus value $FV_{MAX}$ (S101).

If seven regions in the same horizontal position have the same focal position value $DS_{FOC}$ (S102), the DCP 507 selects the focal position value $DS_{FOC}$ (S103). For example, if regions A1 through A7 illustrated in FIG. 12 have the same focal position value $DS_{FOC}$, the DCP 507 selects the focal position value $DS_{FOC}$. In addition, if regions A15 through A21 have the same focal position value $DS_{FOC}$, the DCP 507 selects the focal position value $DS_{FOC}$.

Similarly, if seven regions in the same vertical position have the same focal position value $DS_{FOC}$ (S104), the DCP 507 selects the focal position value $DS_{FOC}$ (S105). For example, if regions A2, A9, A16, A23, A30, A37, and A44 illustrated in FIG. 8 have the same focal position value $DS_{FOC}$, the DCP 507 selects the focal position value $DS_{FOC}$. In addition, if regions A3, A1, A17, A24, A31, A38, and A45 have the same focal position value $DS_{FOC}$, the DCP 507 chooses the focal position value $DS_{FOC}$.

If two or more focal position values $DS_{FOC}$ are selected in operations S103 and S105, the DCP 507 sets at least one focal position value $DS_{FOC}$ having the shortest focal distance among the selected focal position values $DS_{FOC}$ as the subject region (S106 and S110).

If only one focal position value $DS_{FOC}$ is selected in operations S103 and S105, the DCP 507 sets a region of the selected focal position value $DS_{FOC}$ as the subject region (S106 and S109).

If at least one subject region is set in operations S109 and S110, the DCP 507 sets regions excluding the subject region as the out-focusing region (S11).

The DCP 507 outputs a focal position value $DS_{FOC}$ of the subject region to the micro-controller 512 (S112). Accordingly, the micro-controller 512 controls the lens driver 510 of FIG. 3 to drive the focus motor $M_F$, which then moves the focal lens to a focal position of the subject region.

Figure 13:
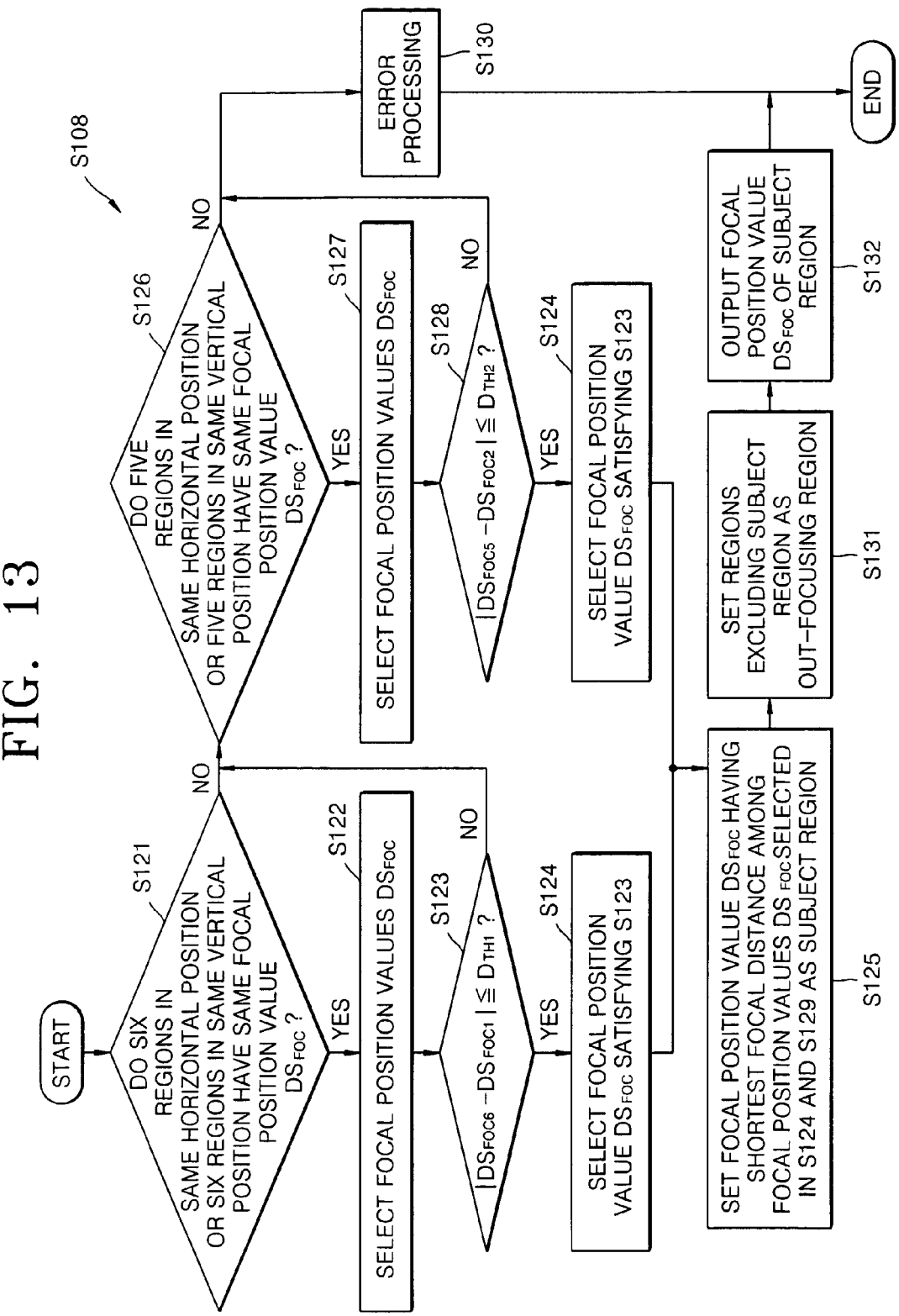
FIG. 13 is a flowchart of an embodiment of the additional search program illustrated in FIG. 11.

If a focal position value $DS_{FOC}$ is not selected in operations S109 and S110, an additional search is conducted (S106 and S108). FIG. 13 is a flowchart illustrating the additional search program (S108) of FIG. 11 in detail. The additional search program (S108) will be sequentially described with reference to FIGS. 10, 12, and 13.

If six regions except for one region in the same horizontal position have the same focal position value $DS_{FOC}$, the DCP 507 selects the focal position value $DS_{FOC}$. Similarly, if six regions except for one region, in the same vertical position have the same focal position value $DS_{FOC}$, the DCP 507 selects the focal position value $DS_{FOC}$ (S121 and S122).

For example, if regions A2 through A7 excluding A1 in the same horizontal region illustrated in FIG. 12 have the same focal position value $DS_{FOC}$, the DCP 507 selects the focal position value $DS_{FOC}$. Likewise, if regions A15, A16, and A18 through A21 excluding A17 in the same horizontal region illustrated in FIG. 12 have the same focal position value $DS_{FOC}$, the DCP 507 selects the focal position value $DS_{FOC}$.

If regions A1, A8, A15, A29, A36, and A43 excluding A22 in the same vertical region illustrated in FIG. 12 have the same focal position value $DS_{FOC}$, the DCP 507 selects the focal position value $DS_{FOC}$. Likewise, if regions A7, A21, A28, A35, A42, and A49 excluding A14 in the same vertical region illustrated in FIG. 12 have the same focal position value $DS_{FOC}$, the DCP 507 selects the focal position value $DS_{FOC}$.

From focal position values $DS_{FOC}$ selected in operation S122, the DCP 507 selects focal position values $DS_{FOC6}$ whose differences from a focal position value $DS_{FOOC1}$ of one of regions in the same horizontal position are equal to or less than a threshold value $D_{TH1}$. The DCP selects focal position values $DS_{FOC6}$ whose differences from a focal position value $DS_{FOOC1}$ of one of the regions in the same vertical position are equal to or less than the threshold value $D_{TH1}$ (S123 and S124).

The DCP 507 sets a focal position value $DS_{FOC}$ having the shortest focal distance selected from the focal position values $DS_{FOC}$ in operation S124 as the subject region (S125).

The DCP 507 sets regions excluding the subject region as the out-focusing region (S131). The DCP 507 outputs the focal position value $DS_{FOC}$ of the subject region to the micro-controller 512 (S132). Accordingly, the micro-controller 512 controls the lens driver 510 of FIG. 3 to drive the focus motor $M_F$, which then moves the focal lens to the focal position of the subject region.

If a focal position value $DS_{FOC}$ satisfying the conditions of operations S121 and S123 is not selected, an additional search is conducted as follows.

If five regions excluding one region in the same horizontal position have the same focal position value $DS_{FOC}$, the DCP 507 selects the focal position value $DS_{FOC}$, and if five regions excluding one region in the same vertical position have the same focal position value $DS_{FOC}$, the DCP 507 selects the focal position value $DS_{FOC}$ (S126 and S127).

For example, if regions A17 through A21 excluding A15 and A16 in the same horizontal region illustrated in FIG. 12 have the same focal position value $DS_{FOC}$, the DCP 507 selects the focal position value $DS_{FOC}$. Likewise, if regions A23 and A25 through A28 excluding A22 and A24 in the same horizontal region illustrated in FIG. 12 have the same focal position value $DS_{FOC}$, the DCP 507 selects the focal position value $DS_{FOC}$.

If regions A3, A10, A24, A38, and A45 excluding A17 and A31 in the same vertical region illustrated in FIG. 12 have the same focal position value $DS_{FOC}$, the DCP 507 selects the focal position value $DS_{FOC}$. Likewise, if regions A11, A18, A25, A32, and A39 excluding A4 and A46 in the same vertical region illustrated in FIG. 12 have the same focal position value $DS_{FOC}$, the DCP 507 selects the focal position value $DS_{FOC}$.

From the focal position values $DS_{FOC}$ selected in operation S127, the DCP 507 selects focal position values $DS_{FOC5}$ whose differences from the average $DS_{FOC2}$ of focal position values $DS_{FOC}$ of two regions in the same horizontal position are equal to or less than a threshold value $D_{TH2}$. The DCP 507 selects focal position values $DS_{FOC5}$ whose differences from the average $DS_{FOC2}$ of focal position values $DS_{FOC}$ of two regions in the same vertical position are equal to or less than the threshold value $D_{TH2}$ (S128 and S129)

The DCP 507 sets a region of at least one focal position value $DS_{FOC}$ having the shortest focal distance out of the focal position values $DS_{FOC}$ selected in operation S129 as the subject region (S125). The DCP 507 sets regions excluding the subject region as the out-focusing region (S131).

The DCP 507 outputs a focal position value $DS_{FOC}$ of the subject region to the micro-controller 512 (S132). Accordingly, the micro-controller 512 controls the lens driver 510 to drive the focus motor $M_F$, which then moves the focal lens to a focal position of the subject region.

If a focal position value $DS_{FOC}$ satisfying the conditions of operations S126 and S128 is not selected, the DCP 507 performs error processing such as outputting an error signal (S130).

According to the automatic out-focusing (S703 of FIG. 7) algorithm, at least one focal position value finally selected from focal position values of the regions A1 through A49 of FIG. 12 is commonly applied to regions in a horizontal or a vertical direction and has the shortest focal distance. Therefore, there is a high possibility that the object region, which is a desired focal target of the user, can be detected.

The reproduction mode (S9) program of FIG. 4 will now be described with reference to FIGS. 1 through 3 and 14. The DCP 507 identifies the type of a latest file created in the memory card (S90). If the latest file created in the memory card is a still-image file, the DCP 507 transmits data of the still-image file to the LCD driver 514. Accordingly, the LCD panel 35 displays an image in the still-image file (S911).

After operation S911, if a left or right signal is not generated by a left or right functional button 15 (S912), the DCP 507 performs the following operations. If a signal is generated by the wide angle-zoom button $39_W$ (S914), the DCP 507 transmits data of a still-image reduced from its displayed image to the LCD driver 514. Accordingly, the color LCD panel 35 displays the reduced still-image (S915). Conversely, if a signal is generated by the telephoto-zoom button $39_T$ (S916), the DCP 507 transmits data of a still-image enlarged from its displayed image to the LCD driver 514. Accordingly, the color LCD panel 35 displays the enlarged still-image (S917).

If a signal is not generated by the reproduction mode button 42, operation S912 and its subsequent operations are performed, and, if generated, the reproduction mode (S9) is terminated (S918).

After operation S911, if the left or right signal is generated by the left or right functional button 15 (S912), the DCP 507 identifies the type of a file corresponding to the generated signal (S913).

In operation S913, if the file is a still-image file, the DCP 507 performs operation S911 and its subsequent operations. On the other hand, in operations S90 and S913, if the file is a moving-image file, the DCP 507 performs the following operations.

The DCP 507 transmits an image of an initial frame in a corresponding moving-image file to the LCD driver 514.

Accordingly, the color LCD panel 35 displays the image of the initial frame as a representative image of the moving-image file (S901). While the representative image is displayed, if a reproduction/termination signal is not generated, i.e., if the user has not pressed the manual adjust/reproduce/terminate button 37 (S903), the DCP 507 performs operation S912 and subsequent operations.

While the representative image is displayed, if the user presses the manual adjust/reproduce/terminate button 37 (S903), thus generating the reproduction/termination signal, the DCP 507 performs the following operations.

Moving-image data and audio data stored in the moving-image file are transmitted to the LCD driver 514 and the audio processor 513, respectively, and reproduced (S904).

If the left signal is generated when the left button is pressed (S905), the DCP 507 performs rewind (S906). Similarly, if the right signal is generated when the right button is pressed (S907), the DCP 507 performs fast-forward (S908).

If the reproduction/termination signal is not generated, i.e., if the user has not pressed the manual adjust/reproduce/terminate button 37 (S909), the DCP 507 performs operation S904 and its subsequent operations.

If the reproduction/termination signal is generated after the user pressed the manual adjust/reproduce/terminate button 37 (S909), the DCP 507 terminates the reproduction (S910) and performs operation S903 and its subsequent operations.

As described above, according to a digital photographing apparatus and a method of controlling the same, a setting region determined optionally or automatically when a user sets an out-focusing mode becomes clear while the remaining out-focusing region becomes blurred. Accordingly, general users without knowledge about camera lenses can easily perform out-focusing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus to perform an out-focusing photographic effect, the method comprising:
   displaying an image of a photographing subject on a display screen;
   displaying a movable target window over the image displayed on the display screen;
   setting a first region of the image using the movable target window, wherein the first region defines a focus area and a second region excluding the first region defines an out-focusing area of the image;
   capturing an image of the photographing subject; and
   storing the image as an image file having an out-focused photographic effect in a non-volatile memory,
   wherein the out-focused photographic effect is a result of normal focusing performed on the first region and out-focusing performed on the second region.

2. The method of claim 1, wherein the out-focusing of the second region comprises low-pass filtering image data of the second region.

3. The method of claim 1, wherein setting the second region comprises:
   detecting a direction signal; and
   moving the target window in response to detecting the direction signal.

4. The method of claim 3, wherein
   the direction signal is generated from at least one directional button.

5. The method of claim 1, wherein setting the second region comprises:
   detecting a zooming signal; and
   changing the size of the target window in response to detecting the zooming signal.

6. The method of claim 5, wherein
   the zooming signal is generated from at least one zooming button.

7. A method of controlling a digital photographing apparatus to perform an out-focusing photographic effect, the method comprising:
   detecting a photographing region;
   estimating a subject region within the photographing region, wherein the subject region is smaller than the photographing region;
   setting an out-focusing region of the photographing region, the out-focusing region excluding the subject region;
   capturing an image corresponding to an image of the photographing region, wherein the image of the subject region is in focus;
   processing the captured image to out-focus the out-focusing region; and
   storing the processed image data in an image file representing an image having an out-focused photographic effect,
   wherein the step of estimating a subject region within the photographing region comprises:
   dividing the photograph region into a plurality of sub-regions;
   obtaining the maximum focus value for the photograph region;
   obtaining focal position values for each of the sub-regions, wherein the focal position values correspond to the maximum focus value for the photograph region; and
   selecting a focal position value for the subject region based on a comparison of at least two sub-regions from among the plurality of sub-regions,
   wherein the step of selecting a focal position value for the subject region comprises:
   comparing the focal position values for each sub-region in a first horizontal position;
   setting a focal position value if all sub-regions in the first horizontal position have a same focal position value;
   comparing the focal position values for each sub-region in a first vertical position;
   setting a focal position value if all sub-regions in the first vertical position have the same focal position value;
   repeating the comparing and setting steps for each subsequent horizontal and vertical position of sub-regions;
   determining whether at least one focal position has been set;
   if no focal position has been set, performing additional operations to determine the subject region;
   if one focal position has been set, setting the subject region as the area encompassing the sub-regions corresponding to the set focal position value; and
   if more than one focal position value is set, setting the subject region by selecting the sub-regions corresponding to the focal position value with a shortest focal distance.

8. The method of claim 7, wherein the step of performing additional operations to determine the subject region comprises:
   setting a focal position value when a first proportion of a group of sub-regions have the same focal position value;
   if no focal position value is set based upon the first proportion, setting a focal position value when a second proportion of the group of sub-regions have the same focal position value; and
   if no focal position value is set based upon the first proportion or the second proportion, performing error processing operations.

9. The method of claim 8, wherein the step of setting a focal position value when a first proportion of a group of sub-regions have the same focal position value comprises:
   comparing the focal position values for each sub-region in a first horizontal position;
   setting a focal position value if all but a predetermined number of the sub-regions in the first horizontal position have the same focal position value;
   comparing the focal position values for each sub-region in a first vertical position;
   setting a focal position value if all but the predetermined number of the sub-regions in the first vertical position have the same focal position value;
   repeating the comparing and setting steps for each subsequent horizontal position and vertical position of sub-regions;
   determining whether at least one focal position value has been set;
   determining whether a set focal position value passes a threshold test, wherein the threshold test comprises determining whether the difference value between each set focal position value and the focal values of excluded sub-regions within the same horizontal position or vertical position is equal to or less than a threshold value; and
   setting the subject region as the area encompassing the sub-regions corresponding to a set focal position value which passes the threshold test and has the shortest focal distance.

10. The method of claim 8, wherein the step of setting a focal position value when a second proportion of the group of sub-regions have the same focal position value comprises:
   comparing the focal position values for each sub-region in a first horizontal position;
   setting a focal position value if all but a second predetermined number of the sub-regions in the first vertical position have the same focal position value and are separated by no more than a third predetermined number of consecutive non-matching sub-regions;
   comparing the focal position values for each sub-region in a first vertical position;
   setting a focal position value if all but the second predetermined number of the sub-regions in the first vertical position have the same focal position value and are separated by no more than the third predetermined number of consecutive non-matching sub-regions;
   repeating the comparing and setting steps for each subsequent horizontal position and vertical position of sub-regions;
   determining whether a set focal position value passes a second threshold test, wherein the second threshold test comprises determining whether the difference value between each set focal position value and the average focal values of the excluded sub-regions within the same horizontal position or vertical position is equal to or less than a second threshold value; and
   setting the subject region as the area encompassing the sub-regions corresponding to a set focal position value which passes the second threshold test and has the shortest focal distance.

11. The method of claim 7, wherein the photographing region is divided into forty-nine sub-regions comprised of seven vertical positions and seven horizontal positions.

12. The method of claim 7, further comprising moving a lens to a position corresponding to the selected focal position value.

13. A digital photographing apparatus for performing an out-focusing photographic effect, the apparatus comprising:
   an optical system configured to receive light from a subject to be photographed by the apparatus;
   a display screen configured to display an image of a photographing subject and to display a movable target window over the displayed image;
   a digital processor configured to set a first region of the displayed image in association with the target window, wherein the first region defines a focus area and a second region excluding the first region defines an out-focusing area of the displayed image, and to capture an image of the photographic subject; and
   a data storage configured to store the image as an image file having an out-focused photographic effect,
   wherein the out-focused photographic effect is a result of normal focusing performed on the first region and out-focusing performed on the second region.

14. The digital photographing apparatus of claim 13, wherein the digital processor is further configured to:
   estimate the first region within a photographing region, wherein the first region is smaller than the photographing region;
   set a first out-focusing area and a second out-focusing area of the second region, the first and second out-focusing areas excluding the first region; and
   out-focusing the image data for the second region,
   the digital photographic apparatus further comprising:
   a first cut-off frequency filter having a first frequency value configured to operate on the first out-focusing area; and
   a second cut-off frequency filter having a second frequency value differing from the first frequency value configured to operate the second out-focusing area.

15. The digital photographing apparatus of claim 13, further comprising a mode selection mechanism configured to place the digital photographing apparatus in at least an out-focusing photographing mode.

16. The digital photographing apparatus of claim 13, further comprising a photoelectric converter configured to convert the light received by the optical system into electric analog signals.

17. The digital photographing apparatus of claim 16, further comprising a correlation double sampler and analog-to-digital converter configured to process the analog signals output from the photoelectric converter, remove high frequency noise from the signals, alter the bandwidth of the signals, and convert the signals into digital signals, which are processed by the digital processor.

18. The digital photographing apparatus of claim 13, further comprising,
   a detector configured to detect a target window movement direction signal that designates a specific direction for target window movement, wherein the processor is further configured to move the target window in the specified direction in response to the detected direction signal.

19. The digital photographing apparatus of claim 13, further comprising,
 a detector configured to detect a target window zooming signal for changing a size of the target window, wherein the processor is further configured to change the size of the target window in response to the detected target window zooming signal.

20. The digital photographic apparatus of claim 13, further comprising a low-pass filter configured to process image data of the second region for out-focusing of the second region.

* * * * *